United States Patent Office 3,310,507
Patented Mar. 21, 1967

3,310,507
FOAMED EPOXY RESINS
James W. Shepherd, Gibsonia, Pa., assignor to Callery Chemical Company, Pittsburgh, Pa., a corporation of Pennsylvania
No Drawing. Filed Dec. 26, 1963, Ser. No. 333,663
5 Claims. (Cl. 260—2.5)

This invention relates to foamed epoxy resins and to their preparation. More particularly the invention relates to foamed epoxy resin compositions which cure rapidly at room temperature with the production of foams of superior properties.

The room temperature initiation curing of certain epoxy resins with a lower trialkoxyboroxine has been suggested. It has been further proposed to use a volatile blowing agent in combination with this curing agent in order to get a foam. However, various combinations of curing agent and blowing agent have not fulfilled expectations in that the properties and qualities of the resultant foam have not met commercial needs.

Boron trifluoride will cure epoxy resins extremely rapidly and will produce a foam if the epoxy resin contains a blowing agent. However, since boron trifluoride is a poisonous gas and is difficult to handle, it is generally undesirable for this use. Although complexes of boron trifluoride with amines are liquids or solids and are therefore easy to handle, they will not react with epoxy resins at room temperature. The boron trifluoride amine complex is a latent curing agent and the complex must be broken up, for example by heating, in order to achieve curing of the resin.

I have discovered and it is the basis of my invention that certain epoxy resins can be cured at room temperature with a rapid initiation of the cure to a foam having a higher percent closed cell structure and improved texture and properties by using a relatively small amount of a boron trifluoride-amine complex as a co-curing agent with a lower alkoxyboroxine.

In accordance with this invention certain liquid epoxy resins may be foamed at room temperature with a lower trialkoxyboroxine having alkyl groups of 1 to 4 carbon atoms and a minor amount of a complex of boron trifluoride and an amine. Upon admixture reaction is almost immediately initiated with a rapid cure of the resin to a rigid foam having a high percent closed cell structure, good foam texture and less friability than foams made with only a lower alkoxyboroxine as the curing agent.

Trimethoxyboroxine is the cheapest and most readily available of the trialkoxyboroxines usable in my invention and for this reason it is the preferred reactant. However, higher alkyl boroxines are usable up through the tributoxyboroxines.

Boron trifluoride forms complexes or coordination compounds of varying strength with amines. These boron trifluoride complexes which are useful in my invention are the complexes with the primary lower alkyl amines, the tertiary lower alkanol amines and complexes with piperidine, urea and hexamethylene tetramine.

I have discovered that the resins with which this invention is most satisfactory and are preferred by me are the dicycloalkane oxide carboxylates, limonene dioxide, dicyclopentadiene dioxide, vinyl cyclohexene dioxide and mixtures of these resins. The dicyclohexane oxide carboxylates have the general formula:

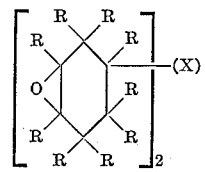

where R represents hydrogen or lower alkyl groups and may be the same or different on the cyclohexane nucleus and X represents radicals selected from

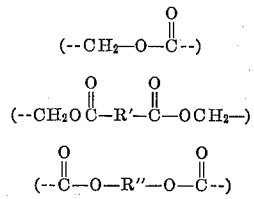

where R' represents members selected from aliphatic and aromatic hydrocarbon groups containing from 2 through 12 carbon atoms, and R'' represents members selected from lower aliphatic hydrocarbon groups and lower oxyalkylene groups. A typical member is 3,4-epoxy-6-methylcyclohexylmethyl-3,4-epoxy-6-methyl cyclohexanecarboxylate (PP1). Futher examples are described in U.S. Patent 2,890,195.

I have further discovered that good foams may be produced if these preferred resins contain up to about 30% of other resins such as the polyepoxides of polyolefins, the glycidyl ethers of polyhydric phenols and polyhydric alcohols, the epoxylated novolacs, and the epoxidized fatty oils of animal or vegetable origin.

The polyepoxides of polyolefins are described in U.S. Patents 2,826,556, 2,829,130, 2,829,131, 2,829,135 and 2,833,747. The epoxylated novolac resins have the general structure

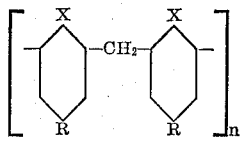

where $n$ is greater than 1, R is selected from hydrogen and lower alkyl, and X is

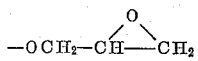

The epoxidized fatty oils of animal or vegetable origin include epoxidized cotton seed oil, epoxidized castor oil, epoxidized linseed oil, epoxidized soybean oil, epoxidized menhaden oil, and epoxidized lard oil.

The glycidyl ethers of polyhydric alcohols or phenols form a well recognized class of epoxidized compositions. They may be monomeric or polymeric in nature depending on the method of preparation. Illustrative of glycidyl ethers are diglycidyl polyethers such as diglycidyl ethers of ethylene glycol, trimethylene glycol, glycerol and the like, compounds containing more than two glycidyl groups such as polyglycidyl ethers of glycerol, diglycerol, erythritol, mannitol, sorbitol, polyallyl alcohol and the like, glycidyl ethers of a polyhydric phenol including pyrogallol and phloroglucinol, but particularly of a dihydric phenol, including mononuclear phenols such as resorcinol, catechol, 2,2-bis(4-hydroxyphenyl) propane, and the like, or polynuclear phenols such as bis(4-hydroxynaphthyl) pentane; 1,5-dihydroxynaphthalene and the like. A useful polyepoxide is the glycidyl ether of bisphenol A, a polymeric material having a variety of molecular species, which is obtained from the reaction of bis(hydroxyphenyl) dimethylmethane with epichlorohydrin.

As will be seen in the following examples superior foams are produced by the reaction of the epoxy resins with the combined curing agent. However, it is contemplated that other materials such as foaming agents or foam modifiers may be utilized in combination with my curing agents. For example, auxiliary blowing agents such as the alkanes, halogenated alkanes and related hydrocarbons may be used if increased foaming is desired to a lower density product. Furthermore, suitable surfactants may be included in the formulation of the type which are art recognized as being helpful in producing superior quality foams. Also certain fire retardant materials may be incorporated into the resin prior to foaming if fire retardant properties are desired in the resultant foam. Also, any of the many filler materials may be incorporated into the resin prior to foaming provided that such incorporation does not materially detract from the qualities of the resultant foam product. And any additive which will further enhance the properties or quality of the foam may be used.

In order to produce the foam of my invention it is necessary to introduce both of the curing agents simultaneously. This is most conveniently accomplished by adding the two curing agents as a mixture directly to the resin at room temperature whereupon initiation of cure almost immediately begins. However, if preferred, these two curing agents may be added separately.

The amount of curing agent to be used depends not only on the particular resin or combination of resins but also upon the type and amount of other materials such as blowing agents, surfactants, additives, modifiers, and fillers which may be used and also depends upon the quality and type of foam product desired. I have discovered that suitable foams are produced if the amount of trialkoxyboroxine varies between about 5 to 25 parts based up 100 parts of the resin and if the amount of boron trifluoride-amine complex is from about 0.1 to 10 weight percent of the total curing agent used. The amount of each curing agent used will depend in part upon its molecular weight—the curing effect being in general inversely proportional to the molecular weight. Increasing the amount of the boron trifluoride-amine complex in my invention generally decreases the shrinkage of the resulting foam, decreases the friability of the foam and decreases the initiation and rise time of the foam. However, use of large or excessive amounts of the complex may cause a detrimental effect on foam properties and cause such a rapid initiation of cure that their use is not practical.

An attempt was made to introduce the boron trifluoride-amine complex dissolved in methanol and in pyridine but in both cases the quality of the foam was affected by the solvent in an adverse manner. The effect of using the boron trifluoride-amine complex as a co-catalyst with trialkoxyboroxines varies with the composition being cured. With properly selected formulations the resulting foam will have an increased percent of closed cells, will have reduced shrinkage in the resulting foam and a decreased friability. Friability in connection with foams is that tendency of the foam to crumble and powder under the application of pressure or frictional contact with other objects. Substantial friability is an undesired property in foams.

The following examples are illustrative of my invention.

Example 1

A mixture containing 20 g. of PP1, 2 ml. of R-11 (trichlorofluoromethane) and 1 ml. of Union Carbide Corporation's L-520 surfactant (a mixture of dimethyl and phenylmethyl polysiloxanes commonly used for cell control in resin foaming) was prepared. The curing agent consisting of 1 ml. of trimethoxyboroxine and 0.4 mol of boron trifluoride complexed with monoethylamine was added with stirring. Foaming started after six seconds and was completed in less than a minute. The blow was very high to a good low density foam. There was a good closed cell structure in the product and little perceptible shrinkage.

The experiment was repeated using the same procedure and proportions except that the boron trifluoride complex was omitted. Foaming started about 2 minutes after the addition of the trimethoxyboroxine. There was only about 50% blow with very severe shrinkage and an obviously incomplete cure.

Example 2

A stock solution was prepared consisting of 20 parts by weight of PP1, 1.9 parts of R-11 and 0.18 part of L-520. One half ml. of R-113 (1,2-trichloro, trifluoromethane) was added to 20 g. of this stock solution and to this was added, with stirring, a mixture consisting of 1 ml. trimethoxyboroxine and 0.2 ml. of the boron trifluoride complex with monoethylamine. There was a rapid but controllable initiation of the cure. The resulting foam had no perceptible shrinkage, possessed a density of 1.62 lbs./cu. ft. and had 80% closed cells.

Example 3

A partial prepolymer was formed by adding 150 g. (.25 equivalent) of Empol 1014 dimer acid (Emery Industries) to 150 g. of vinylcyclohexene dioxide heated to 140–160° C. Heating was continued until the acid number decreased to 4 (1 hour). The product, an alkylene bis-epoxyethyl hydroxy cyclohexane carboxylate dissolved in excess vinylcyclohexene dioxide, was a viscous orange liquid. By analysis 96% of the carboxyl groups of the dimer acid were esterified.

Example 4

A solution of 15 g. of PP1, 5 g. of the partial prepolymer prepared in Example 3, 3 ml. of R-11 and .25 ml. of L-520 was formed. To this was added 2 ml. of trimethoxyboroxine. Foaming started after 24 seconds and was completed in one minute. The product foam exhibited 25% shrinkage after cooling and possessed 32% closed cells and a final density of 1.69 lbs./cu. ft.

Example 5

The same resin and additive mixture was used as that in the preceding example; that is, 15 g. of PP1, 5 g. of the prepolymer, 3 ml. of R-11 and .25 ml. of L-520. A 2 ml. mixture of trimethoxyboroxine and borontrifluoride complexed with monoethyl amine in the weight ratio of 39 to 1 was added to the resin mixture with stirring for 9 seconds, at which point foaming started. The foaming was completed in 48 seconds to a product which had 10% shrinkage on cooling, a density of 1.61 lb./cu. ft. and 72% closed cell structure.

Example 6

Example 5 was repeated except that a 2 ml. solution of the same curing agents in a weight ratio of 9 to 1 was used. Foaming started after 2 seconds and was completed in 1 more second. There was some internal splitting with 5% shrinkage. The product foam had a density of 1.48 lbs./cu. ft. and 64% closed cells.

Example 7

A 1 ml. solution of the same curing agents in the weight ratio of 19 to 1 was used with the same resin and additive mixture as used in Example 5. The cure was incomplete indicating that insufficient curing agent was used.

Example 8

Fifteen g. of PP1, 3 ml. of R-11 and 0.3 ml. of L-520 was mixed with 5 g. of diglycidyl ether of bisphenol A (DER 332 made by Dow Chemical Co.). A mixture of trimethoxyboroxine and boron trifluoride complexed with monoethyl amine having 39 to 1 weight ratio was added. The rise started in 4 seconds and was complete in 18 seconds. The cooled foam product exhibited a 10% shrinkage and had a density of 1.36 lb./cu. ft. and 88% closed cells.

Example 9

A mixture of 225 g. of PP1 and 75 g. of Araldite 6030 (Ciba Products liquid diglycidal ester of bisphenol A having an epoxy equivalent of 226) was prepared and mixed with 20 ml. of R-11 and 3 ml. of L-520. Twenty ml. of curing agent consisting of trimethoxyborane and 2.5% $BF_3 \cdot CH_3CH_2NH_2$ complex. Foaming started in 4 seconds and was completed in 42 seconds. There was less than 5% shrinkage on cooling to a 1.69 lb./cu. ft. product having 83% closed cells and very good non-friability.

Example 10

The experiment of the preceding example was repeated without using the boron trifluoride complex for comparison purposes, that is, 20 ml. of trimethoxyborane alone was used as the curing agent. Foaming started in 30 seconds and was completed in 90 seconds. There was less than 5% shrinkage on cooling to a 1.76 lb./cu. ft. product having 64% closed cells and poor friability.

Example 11

Two 30 g. mixtures consisting of 24 g. of PP1 and 6 g. of Oxiron 2000 (Food Machinery and Chemical Corporation's epoxidized polybutadiene having an average molecular weight of 1200 and an epoxy equivalent weight of 177) were each mixed with 3 ml. of R-11 and 0.3 ml. of L-520. To the first mixture was added 3 ml. of trimethoxyboroxine and to the second 3 ml. consisting of trimethoxyboroxine and 2.5% of the complex of boron trifluoride with monoethyl amine. The first mixture started to foam in 14 seconds to a foam having less than 5% shrinkage, a density of 1.73 lb./cu. ft. and 3% closed cells. The second mixture started to foam in 3 seconds to a foam having less than 5% shrinkage, a density of 1.43 lb./cu. ft. and 82% closed cells.

Example 12

Twenty ml. of a trimethoxyboroxine solution containing 6.8% of a complex of $BF_3$ with piperidine was added to a mixture of 300 g. of 3,4-epoxycyclohexylmethyl-3,4-epoxycyclohexane carboxylate, 20 ml. of R-11 and 3 ml. of L-520. Foaming started in 10 seconds and was completed in 30 seconds to a 1.60 lb./cu. ft. product. The foam exhibited no shrinkage and possessed 68% closed cells.

Example 13

A mixture consisting of 27 g. of PP1, 3 g. of Emery Industries' dimer acid Empol 1018 (a polybasic acid consisting of 83% dimer and 17% trimer having a neutralization equivalent of 287-299), 3 ml. of R-11 and 0.3 ml. of L-520 was prepared. Foaming was initiated in 3 seconds by 3 ml. of trimethoxyboroxine containing 6.8% of the $BF_3$ piperidine complex and was completed in 26 seconds. The foam exhibited less than 5% shrinkage and possessed a density of 1.69 lb./cu. ft., 81% closed cells and good non-friability.

Example 14

Three identical mixtures were prepared each consisting of 24 g. of PP1, 6 g. of Shell Chemical Company's Epon 1031 (tetraglycidyl ether of tetraphenyl ethane having an epoxy equivalent weight of 200-220), 3 ml. of R-11, and 0.3 ml. of L-520. Each mixture was treated with 3 ml. of a different curing agent. The first curing agent was trimethoxyboroxine while the second and third were trimethoxyboroxine containing 3.4% and 6.8% $BF_3 \cdot$piperidine complex respectively. The first foam started to rise in 8 seconds and was completed in 53 seconds, the second in 4 seconds and 41 seconds, and the third in 3 and 27 seconds. The first two foams possessed good and the third very good friability. The first foam shrank 10%, the second did not shrink, and the third shrank less than 5%. The first possessed 29% closed cells, the second 72% and the third 82%. The densities were 1.58, 1.38 and 1.47 respectively.

Example 15

A liquid mixture consisting of 300 g. of PP1 100 g. of Araldite 6030, 30 ml. of R-11 and 4 ml. of L-520 was formulated. To this mixture was added 28 ml. of trimethoxyboroxine and 2.3 g. of $BF_3$ complexed with triethanolamine. The foaming was initiated in 12 seconds and was completed in 55 seconds. There was no apparent shrinkage. The foam had 79% closed cells, a density of 1.71 and a quite good non-friability. When the identical formulation was treated with 30 ml. of trimethoxyboroxine the initiation of foaming began in 40 seconds to a full rise in 95 seconds. There was 5% shrinkage. This foam had 52% closed cells, a density of 1.47, and poor non-friability.

Example 16

Two mixtures of 22.5 g. PP1, 7.5 g. Araldite 6030, 3 ml. R-11 and 0.3 ml. L-520 were prepared. To the first was added 3 ml. of trimethoxyboroxine containing 2.8% of the $BF_3$ urea complex. Foaming began in 2 seconds and was completed in 18 seconds. There was appreciable shrinkage, however, the final foam possessed a density of 1.56, had 77% closed cells and fair non-friability.

Example 17

The second mixture prepared in the preceding example was treated with 5 ml. of trimethoxylboroxine, 0.11 g. of the $BF_3 \cdot$hexamethylene tetramine complex. Initiation took 6 seconds and full rise 43 seconds. There was almost no shrinkage. The foam density was 1.47, its non-friability was good and it had 75% closed cells.

Example 18

A 20 ml. solution of trimethoxyboroxine containing 2.5% of boron trifluoride monoethylamine complex was prepared. Twenty g. of PP1 was treated with 2 ml. of this curing agent 5 minutes, 24 hours and 35 days after the curing agent was prepared. There was a comparable initiation to a rapid cure and comparable product in each case. After 35 days there was no pressure build-up, discoloration nor precipitation in the curing agent container. It was concluded that the mixture of curing agents possessed good storage stability.

Example 19

A mixture was prepared consisting of 300 g. of PP1, 100 g. of Swift and Company's Epoxol 9-5 (an epoxidized linseed oil having an epoxy equivalency of 175-178), 35 ml. of R-11 and 4 ml. of L-520. To this was added, concurrently, 15 ml. of trimethoxyboroxine and 12 ml. of a mixture of Union Carbide Corporation's LHT-67 (a triol having a hydroxyl No. of 67) and 33 weight percent of monoethylamine-$BF_3$ complex. The resulting foaming was initiated in 8 seconds and completed in 54 seconds with no shrinkage. It had good non-friability, about 2 lb./cu. ft. density and 60% closed cells.

Example 20

Another mixture consisting of 24 g. of PP1, 3 g. of Dow Chemical Company's DEN 438 (an epoxylated novolac having an epoxy equivalent weight of 179), 3 g. of hexachloroendomethylene phthalic anhydride, 3 ml. of R-11 and 0.3 ml. of L-520 was prepared. To this was added 3 ml. of trimethoxyboroxine containing 6.8% piperidine complexed with boron trifluoride. Foaming started in 1 second and was completed in 21 seconds. There was no shrinkage in the product having a density of 1.66 lb./cu. ft., very good non-friability, 83% closed cells and an excellent rating in relative strength.

It is apparent from the examples that additives may be incorporated in the formulation for altering or modifying the characteristics of the resultant foam. This is a technique which is a characteristic of foam technology. In general it is not possible to accurately predict the resultant effect of these additives, instead empiricism must be resorted to. Notwithstanding this it is intended that the claims cover formulations with or without modifying additives within the scope of the invention as claimed.

As pointed out it has been known that trialkoxyboranes in proper proportions will cause some epoxides to cure to a foam with room temperature initiation of the cure. It is also known that boron trifluoride complexed with amines will cure epoxides to a solid resin upon the application of heat. However, it is entirely unexpected, in comparing their independent effects, that a combination of these two classes of curing agents as described herein will produce a foaming reaction and foam product that is superior to that produced by the trialkoxyboranes alone. It is upon this unexpected feature that this invention is in part predicated.

According to the provisions of the patent statutes, I have explained the principle and mode of practicing my invention and have described what I now consider to be its best embodiments. However, I desire to have it understood that, within the scope of the appended claims, the invention may be practiced otherwise than as specifically described.

I claim:

1. That method of making a foamed epoxy resin material which comprises mixing at about room temperature a liquid polyepoxide reactant selected from the class consisting of a dicycloalkane oxide carboxylate, limonene dioxide, dicyclopentadiene dioxide, vinyl cyclohexene dioxide, and mixtures thereof and from 0 to about 30% of a resin selected from the class consisting of polyepoxides of polyolefins, glycidyl ethers of polyhydric phenols and polyhydric alcohols, epoxylated novolacs, epoxidized fatty oils and mixtures thereof with a curing agent comprising about 5 to 25 parts of a lower trialkoxyboroxine per 100 parts of polyepoxide reactant mixture and 0.1 to 10 weight percent based on the lower trialkoxyboroxine of a boron trifluoride-amine complex, said amine selected from the class consisting of primary lower alkyl amines, tertiary lower alkanol amines, piperidine, urea, and hexamethylene tetramine.

2. That method of making a foamed epoxy resin in accordance with claim 1 in which the trialkoxyboroxine is trimethoxyboroxine.

3. That method of making a foamed epoxy resin in accordance with claim 2 in which the boron trifluoride is complexed with monoethylamine.

4. That method of making a foamed epoxy resin in accordance with claim 2 in which the boron trifluoride is complexed with piperidine.

5. That method of making a foamed epoxy resin in accordance with claim 2 in which the liquid polyepoxide reactant is 3,4-epoxy-6-methylcyclohexylmethyl-3,4-epoxy-6-methylcyclohexane carboxylate.

References Cited by the Examiner

UNITED STATES PATENTS 3,025,249   3/1962   Chen _____ 260—2.5

OTHER REFERENCES

Skeist: "Epoxy Resins," Reinhold Publ. Corp., N.Y., 1958, pages 58 and 187.

MURRAY TILLMAN, *Primary Examiner.*

M. FOELAK, N. F. OBLON, *Assistant Examiners.*